US010491906B2

(12) United States Patent
Wu et al.

(10) Patent No.: US 10,491,906 B2
(45) Date of Patent: Nov. 26, 2019

(54) METHOD AND APPARATUS FOR BLOCK PREDICTION USING VARIABLE BLOCK-SIZE IN IMAGE COMPRESSION

(71) Applicant: MEDIATEK INC., Hsin-Chu (TW)

(72) Inventors: Tung-Hsing Wu, Chiayi (TW);
Li-Heng Chen, Tainan (TW);
Han-Liang Chou, Baoshan Township, Hsinchu County (TW)

(73) Assignee: MediaTek Inc., Hsin-Chu (TW)

( * ) Notice: Subject to any disclaimer, the term of this patent is extended or adjusted under 35 U.S.C. 154(b) by 129 days.

(21) Appl. No.: 15/331,059

(22) Filed: Oct. 21, 2016

(65) Prior Publication Data

US 2017/0134734 A1 May 11, 2017

Related U.S. Application Data

(60) Provisional application No. 62/251,553, filed on Nov. 5, 2015.

(51) Int. Cl.
| H04N 7/12 | (2006.01) |
| H04N 19/176 | (2014.01) |
| H04N 19/119 | (2014.01) |
| H04N 19/154 | (2014.01) |
| H04N 19/182 | (2014.01) |
| H04N 19/186 | (2014.01) |
| H04N 19/91 | (2014.01) |

(52) U.S. Cl.
CPC ......... *H04N 19/176* (2014.11); *H04N 19/119* (2014.11); *H04N 19/154* (2014.11); *H04N 19/182* (2014.11); *H04N 19/186* (2014.11); *H04N 19/91* (2014.11)

(58) Field of Classification Search
CPC .......................... H04N 19/176; H04N 19/154
USPC ...................................... 375/240.12
See application file for complete search history.

(56) References Cited

U.S. PATENT DOCUMENTS

2017/0085886 A1*  3/2017  Jacobson ............. H04N 19/156

* cited by examiner

*Primary Examiner* — Richard T Torrente
(74) *Attorney, Agent, or Firm* — Wolf, Greenfield & Sacks, P.C.

(57) ABSTRACT

Method and apparatus of image coding using block prediction (BP) allowing multiple block sizes are disclosed. According to one method, first distortion for the current block coded using BP with a first block size is derived using at least partial second distortion for the current block coded using BP with a first block size. According to another method, a flag indicating whether the BP using variable block sizes is enabled. According to yet another method, when a current block is coded using BP by partitioning the current block into multiple partitions, predictors for two partitions in different reconstructed pixel line groups are derived from different reconstructed pixel line groups. According to still yet another method, for coding image data in a non-444 color sampling format using BP, the predictors for chrominance pixels in the current block are derived from the predictors for the luminance pixels of the current block.

8 Claims, 13 Drawing Sheets

METHOD AND APPARATUS FOR BLOCK PREDICTION USING VARIABLE BLOCK-SIZE IN IMAGE COMPRESSION

CROSS REFERENCE TO RELATED APPLICATIONS

The present invention claims priority to U.S. Provisional Patent Application, Ser. No. 62/251,553, filed on Nov. 5, 2015. The U.S. Provisional Patent Application is hereby incorporated by reference in its entirety.

FIELD OF THE INVENTION

The present invention relates to block prediction for image coding systems. In particular, the present invention relates to method and apparatus for block prediction using variable block size for image compression applications such as image data transmission over display links.

BACKGROUND AND RELATED ART

Various video coding standards have been developed to reduce the required bitrate for video transmission or the required capacity for storage. For example, MPEG-2, MPEG-4 and AVC/H.264 have been widely used in various applications. In recent years, the coding efficiency has been substantially improved in newer video compression formats such as VP8, VP9 and the emerging HEVC (High Efficiency Video Coding) standards.

In various devices that involve image display, there is another type of application that requires data compression. In particular, display links connecting computers to monitors, set-top boxes to televisions, and application processors to display panels are digital interface formats widely used in the industry. Display links use digital interfaces. With the increasing demand for higher display resolutions and higher frame rates, the amount of data sent over display links becomes extremely high. For example, the display link between a set-box device and a 1080p HDTV at 120 Hz frame rate will require more than 7 Gbits/sec. For UHD (Ultra High Definition) TV, the required data will be four-fold higher. Therefore, display links are often in compressed formats. For example, DSC (Display Stream Compression) standard has been developed jointly by VESA (Video Electronics Standards Association) and MIPI Alliance to address the needs for data compression in display applications.

Due to different requirements, the DSC standard is different from popular video coding standards, such as MPEG-2/4, AVC/H.264 and HEVC. For example, the color space used for compression in display applications may be the YCoCg color space, instead of the YUV color space. Furthermore, DSC only includes Intra-frame compression without Inter-frame compression to minimize the processing delay and avoid the need for reference picture buffer. In typical applications, the compression ratios required for DSC is much smaller those for video storage or network delivery. FIG. 1A illustrates major functional blocks of an exemplary DSC encoder. As shown in FIG. 1A, the DSC encoder includes a source buffer 110, a predictor/quantization/reconstruction unit 112, a VLC entropy coding unit 114, a flatness determination unit 116, a rate control unit 118, a line buffer 120, and an indexed color history (ICH) unit 122. If the input image data are in the RGB color format, a color-space converter (not shown in FIG. 1A) corresponds to a RGB-to-YCoCg color format converter is utilized in the DSC encoder. The information from the flatness determination unit 116 can be used to adjust the QP (quantization parameter) in the rate control unit 118. As shown in FIG. 1, the flatness indication is entropy coded using the VLC entropy coding unit 114 and incorporated in the bitstream. According to DSC, the pixels are processed using a 1×3 block size as shown on FIG. 1B, where a current block 130 is predicted by a reference block 132 in the same pixel row. The location of the reference block 132 is indicated by a corresponding block vector 134.

Upon the growing needs for display links to support higher display resolutions and higher bit depth for color components, VESA initiated development efforts to establish a standard for Advanced Display Stream Compression (ADSC). Also, the ADSC supports native 4:2:0 and 4:2:2 coding to eliminate the need for converting pixels into RGB components. For example, ADSC allows more efficient compression in YCbCr 4:2:0 color sampling format. In addition, ADSC also supports High Dynamic Range (HDR) to accommodate the higher color depth in newer TV shows and movies.

The processing for display links often uses block-based compression, where a picture is divided into blocks and the compression is applied to each block. Furthermore, the compression settings may be applied to an image unit smaller than a picture. For example, Advanced DSC (ADSC) being developed is applied to slices of each picture and the target bitrate is imposed on each slice. Each slice is divided into coding units (i.e., blocks) and each coding unit consists of a block of N×M pixels, where N corresponds to block width and M corresponds to block height. According to ADSC, the characteristics of each block are evaluated in terms of "flatness", where the flatness of each block is categorized into five flatness types as follows:

Type: −1 denotes the "complex block"
Type: 0 denotes the "flat region"
Type: 1 denotes the "flat region (less flat than type 1)"
Type: 2 denotes the "complex to flat block"
Type: 3 denotes the "flat to complex block"

The flatness type is determined according to the complexity information of each block and its neighboring block. Flatness type influences the rate control behavior in each block. According to the existing ADSC draft standard, the syntax of flatness type is signaled in each coding unit.

FIG. 1C illustrates major functional blocks of an exemplary coding system according to the ADSC draft. The ADSC encoder includes a source buffer 140, a mode decision unit 142 to select a best mode for a current block being coded, a block encoding unit 144 to apply predictor, quantization and reconstruction to the current block using the best mode selected by the mode decision unit 142, a VLC entropy coding unit 146, a flatness determination unit 148, a rate control unit 150 and a reconstruction buffer 152. The reconstructed data buffered in the reconstruction buffer 152 will be used as reference data for encoding a current block and/or subsequent blocks. The reconstructed data buffered in the reconstruction buffer 152 will also be used mode decision.

According to ADSC, various coding modes are used for coding the blocks. The coding modes include Transform mode, DPCM mode, BP (block prediction) mode, Pattern mode, MPP (midpoint prediction) mode, and MPPF (MPP fallback) mode. Midpoint Prediction (MPP) mode uses a midpoint value as the predictor in each block. For example, the midpoint value can be determined by half of dynamic range of the pixels or mean value of the neighboring reconstructed pixels of the current block.

FIG. 1D illustrates an exemplary mode decision process according to ADSC draft. The types of modes include regular modes (160 through 164) and fallback modes (165 and 166). For each mode, the R-D cost (rate-distortion cost) is calculated and provided to a respective processing unit (170) to perform the rate-distortion optimization, buffer budget and error check function. The processing unit 170 inspects the buffer budget for each available mode. If all of the available regular modes are detected with buffer error (overflow) or the remaining bits are less than a threshold value, the best mode is chosen from the fallback modes such as MPPF mode or BP-Skip mode according to the corresponding R-D cost. Otherwise, the encoder chooses the best mode among the regular modes by the R-D costs.

It is desirable to further improve the compression efficiency of the ADSC. In particular, the present invention addresses performance improvement for the block prediction mode.

BRIEF SUMMARY OF THE INVENTION

A method and apparatus of image encoding using block prediction allowing multiple block sizes are disclosed. According to this method, first distortion for the current block coded using block prediction with a first block size is derived. The current block is partitioned into one or more first partitions having the first block size and the first distortion corresponds to differences between the first predictors for the current block and the first partitions associated with the current block. Each first predictor is derived from reconstructed pixels prior to the current block. Second distortion for the current block coded using block prediction with a second block size is derived, where the current block is partitioned into one or more second partitions having the second block size. The second distortion corresponds to differences between the predictors for the current block and the second partitions associated with the current block. Each second predictor is derived from the reconstructed pixels prior to the current block. The second distortion is calculated using at least partial first distortion. One or more best predictors are selected from the first predictors and the second predictors and the best predictors are used for predicting the current block. For example, the first block size corresponds to 2×2 and the second block size corresponds to 1×2. The first distortion for 2×2 block prediction can be calculated as two-part distortions for an upper part and a lower part of 2×2 block, and where at least partial two-part distortions calculated for the 2×2 block prediction are reused for calculating the second distortion for 1×2 block prediction. Alternatively, the second distortion for 1×2 block prediction is calculated as two-part distortions for an upper partition and a lower partition of the current block respectively, and where at least partial two-part distortions calculated for the 1×2 block prediction are reused for calculating the first distortion for 2×2 block prediction.

According to a second method, information is signaled to indicate whether block prediction using variable block sizes is enabled. A flag related to the information can be signaled in a sequence level, frame level, slice level or block level of the image bitstream.

According to a third method, a current block is partitioned into multiple partitions, and one predictor is determined for each partition associated with the current block coded using block prediction with a selected block size. Two predictors for two different partitions are derived from different pixel line groups and each pixel line group comprises one or more reconstructed pixel lines processed before the current block.

According to a fourth method, the image data being processed have a non-444 format, such as a 4:2:0 color format. One or more predictors for the luminance pixels of the current block are determined, where the current block is divided into one or more partitions according to the selected block size and one predictor is derived for each partition from reconstructed luminance pixels processed prior to the current block. One or more best luminance predictors are determined from the predictors associated with the variable block sizes. Block prediction with the selected block size is applied to the chrominance pixels of the current block using one or more best chrominance predictors, where the best chrominance predictors are derived from reconstructed chrominance pixels belonging to the best luminance predictors.

According to a fifth method, the block prediction with a first block size corresponding to the current block size is restricted to using a one-dimensional block vector. For a second block size smaller than the first block size, the current block is divided into multiple partitions having the second block size. One second predictor is derived for each partition with one second block vector pointing from said one partition to said one second predictor. At least one second block vector is allowed to be two-dimensional.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2A:
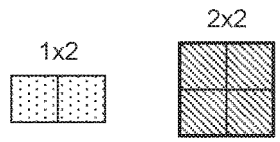
FIG. 2A illustrates an example of allowed variable block sizes (i.e., 2×2 and 1×2) for the block prediction mode according to Advanced Display Stream Compression (ADSC) v0.3.
Figure 2B:
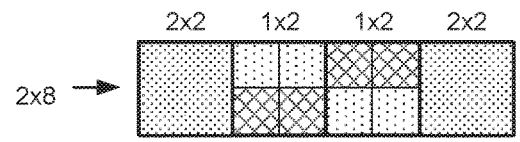
FIG. 2B illustrates an example of an image area consisting of 2×8 pixels, which is divided into four 2×2 blocks. For each 2×2 block, the block can be either coded as one 2×2 block or two 1×2 partitions.

In most image and video coding systems, a picture is divided into blocks and the coding process is applied to individual blocks. Usually, variable block size is allowed in most image and video compression systems. For example, the new video coding standard, HEVC (High Efficiency Video Coding) uses variable block sizes extensively for coding (i.e., coding unit, CU) and prediction (i.e., prediction unit, PU). In Advanced Display Stream Compression (ADSC), the block size for the block prediction mode also can be variable block size. For example, the block size of block prediction mode in ADSC v0.3 can be either 1×2 or 2×2 as shown in FIG. 2A. The block size can be determined adaptively for each 2×2 block. For example, FIG. 2B illustrates an example of an image area consisting of 2×8 pixels, which is divided into four 2×2 blocks. For each 2×2 block, the block can be either coded as one 2×2 block or two 1×2 partitions as shown in FIG. 2B.

Figure 3A:
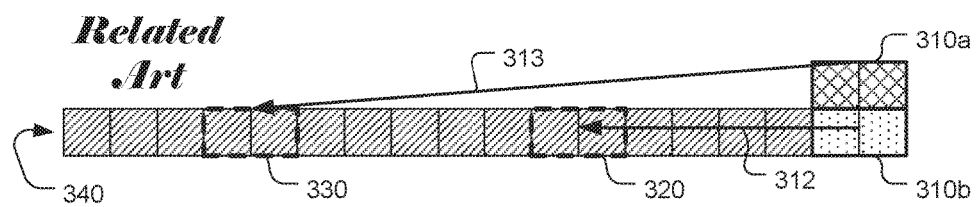
FIG. 3A illustrates an example of block prediction for the 1×2 block prediction mode for a 2×2 block located at the first line of a slice according to the conventional Advanced Display Stream Compression (ADSC).

For ADSC block prediction (BP) mode, each image is partitioned into one or more slices and each slice is partitioned into 2×2 blocks. Each block can be coded using either the 2×2 or 1×2 block prediction mode. FIG. 3A illustrates an example of block prediction for the 1×2 block prediction mode for a 2×2 block located at the first line of a slice according to the conventional ADSC. Partitions 310a and 310b represent two 1×2 partitions of the current block being processed and pixel row 340 filled with slant-lines represents reconstructed pixels prior to the blocks being processed. Blocks 320 and 330 correspond to two candidate blocks for partitions 310b and 310a of the current block respectively. Block vectors 312 and 313 represent the block vectors pointing from partition 310b to the candidate predictor 320 and from partition 310a to candidate predictor 330 respectively.

Figure 3B:
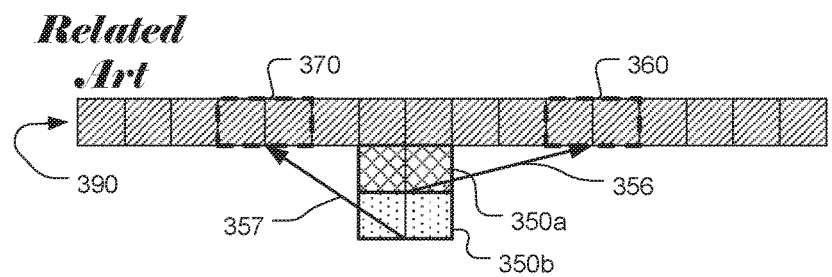
FIG. 3B illustrates another example of block prediction for the 1×2 block prediction mode according to the conventional ADSC for a block in a non-first line of the slice.

FIG. 3B illustrates another example of block prediction for the current block in a non-first line of the slice using the 1×2 block prediction mode according to the conventional ADSC, where an above reconstructed pixel line 390 in the same slice is used for deriving predictors. Blocks 350a and 350b represent two 1×2 partitions being processed. Blocks 360 and 370 correspond to two candidate blocks for the current partitions 350a and 350b respectively. Block vectors 356 and 357 represent the block vectors pointing from the current partition 350a to the candidate block 360 and from the current partition 350b to the candidate block 370 respectively. Again, according to the conventional ADSC, only one row of reconstructed pixels is used for block prediction in the 1×2 block prediction mode.

Figure 4A:
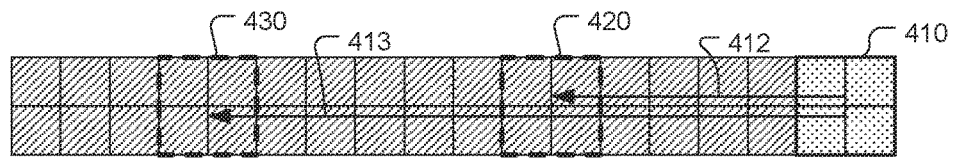
FIG. 4A illustrates an example of block prediction for the 2×2 block prediction mode at the first line of a slice according to the conventional ADSC.

FIG. 4A illustrates an example of block prediction for the 2×2 block prediction mode at the first line of a slice according to the conventional ADSC. Blocks 410 represents a 2×2 block being processed and pixel rows 440 filled with slant-lines represents two reconstructed pixel rows prior to the block 410. Blocks 420 and 430 correspond to two candidate predictors for the current blocks. Block vectors 412 and 413 represent the block vectors pointing from the current block 410 to the candidate predictors 420 and 430 respectively.

Figure 4B:
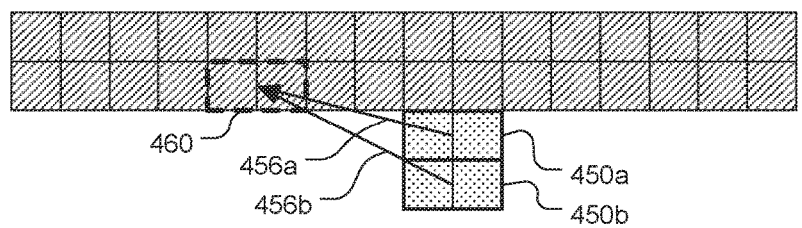
FIG. 4B illustrates an example of block prediction for the 2×2 block prediction mode at a non-first line of a slice according to the conventional ADSC.

FIG. 4B illustrates an example of block prediction for the 2×2 block prediction mode at a non-first line of a slice according to the conventional ADSC. Partitions 450a and 450b represent two part of a 2×2 block being processed. Block 460 corresponds to a candidate predictor for both sub-locks 450a and 450b. Block vectors 456a and 456b represent the block vectors pointing from the partitions 450a and 450b to the candidate block 460.

According to the conventional ADSC, the coding performance is evaluated for all possible candidates with all allowed block sizes. For example, the block prediction residuals, also named distortion in this disclosure, may have to be evaluated for variable block sizes. There will be some redundancy during coding performance evaluations among using different block sizes. Therefore, it is desirable to develop a coding process for block prediction allowing variable block sizes to eliminate or reduce redundancy related to distortion evaluation. Accordingly, in one method of the present invention, second distortion calculated for a current block coded using block prediction with a second block size utilizes at least partial first distortion calculated for the current block coded using block prediction with a first block size. The best candidate and the block size are determined according to performance evaluation information including the second distortion that is derived by utilizing at least partial first distortion. A coding system incorporating this method may partition a picture into one or more slices. Each slice is partitioned into multiple blocks for block prediction. For a current block, a first candidate predictor in the reconstructed area associated with a first block vector for block prediction using a first block size is determined. The first distortion between the first candidate predictor (i.e., reconstructed pixels) and the current block (i.e., source pixels) is calculated. A second candidate predictor in the reconstructed area associated with a second block vector for block prediction using a second block size is determined. The second distortion between the second candidate predictor (i.e., reconstructed pixels) and the current block (i.e., source pixels) is calculated. According to the present method, the calculation of the second distortion will utilize at least partial first distortion.

System based on this method may use different configurations. For example, the system may only allow one-dimensional block vector, such as BV having non-zero value only in the horizontal direction. In this case, only reconstructed pixels on the left side of the current block can be used as prediction pixels. In another example, the system uses the reconstructed pixels above the current block as prediction pixels. The system may also derive prediction pixels from the reconstructed pixels in the same image.

Figure 5A:
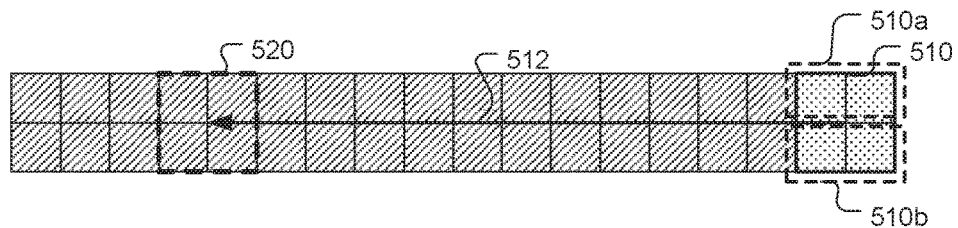
FIGS. 5A-5B illustrate an example using the method of reusing at least partial distortion previously derived, where the distortion for the 2×2 1×2 block prediction mode in FIG. 5A is reused by the distortion for the 1×2 block prediction mode in FIG. 5B, or the other way around.
Figure 5B:
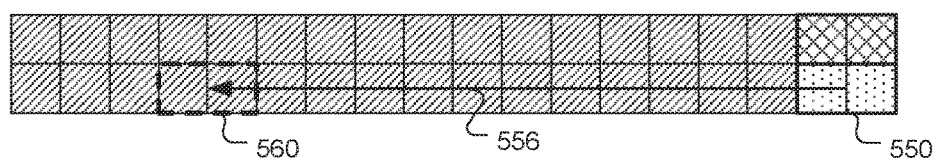

FIG. 5A illustrates an example using the method of reusing at least partial distortion previously derived. Block 510 represents a current block coded in the 2×2 block prediction mode. The candidate predictor 520 is located based on block vector 512. The distortion between the candidate predictor 520 and the current block 510 can be calculated in two parts for the upper part 510a and the lower part 510b (i.e., two partial distortions for block 510). The total distortion for the current block can be calculated as the sum of these two partial distortions. FIG. 5B illustrates an example for calculating the distortion of the current block using block prediction with a different block size (i.e., 1×2).

Block 550 represents a lower block partition. The candidate predictor 560 is located based on block vector 556. The distortion between the candidate predictor 560 and the current block 550 is exactly the same as the partial distortion for the lower part of the 2×2 block 510. According to present method, the distortion for the block 510 is calculated from two partial distortions. The lower partial distortion can be used by the partition 550 for calculating the distortion for the 1×2 block prediction mode. Accordingly, the distortion calculation for block 550 can reuse the partial distortion from block 510 coded in the 2×2 block prediction mode. Alternatively, the distortion can be first calculated for block partition using 1×2 block size. In this case, the distortion for block 550 for the block prediction using 1×2 block size will be reused by distortion calculation for the block prediction using 2×2 block size.

In another aspect of the present invention, the system signals a flag to indicate whether the variable-size block prediction is enabled or disabled. The flag can be signaled in the bitstream. For example, the flag can be signaled in the sequence level, frame level, slice level or block level of the bitstream. When the flag is signaled in a selected level, the variable-size block prediction is enabled or disabled for the whole level. For example, if the flag is signaled in the frame level, the variable-size block prediction is enabled or disabled for the whole frame according to the flag. The block vector can be constrained to one direction. For example, only horizontal block vector is allowed. In this case, the system will only use reconstructed pixels in the left side of the current block. In other embodiments according to this method, the system may use reconstructed pixels above the current block. Furthermore, instead of using the reconstructed pixels directly as prediction pixels, the system may also derive prediction pixels based on the reconstructed pixels.

According to another method of the present invention, predictors for partitions belonging to different pixel line groups are derived from the different pixel line groups respectively. Each line group comprises at least one pixel line. The partitions are generated by partitioning a block having a first block size. After partitioning, each partition has a second block size. The block with the first block is coded using block prediction with the first block size while the partitions are coded using block prediction with the second block size. In the case that a block is partitioned into two partitions, the predictors for the two partitions belonging to two different pixel line groups are derived from said two different pixel line groups respectively according to this method. In other words, if the first partition belongs to the first pixel line group and the second partition belongs to the second pixel line group, the predictor for the first partition is derived from the first pixel line group and the predictor for the second partition is derived from the second pixel line group. The system may partition an image into one or more slices and each slice is partitioned into multiple blocks. The system may various configurations to implement this method. For example, the present method for predictors for different partitions in different pixel line groups are derived from different pixel line groups may be applied to block prediction using variable block sizes. The variable block sizes may comprises a first block size and a second block size, where the first block size is larger than the second block size. In one example, the first block size may be equal to the current block size. In another example, the first block size is equal to N×the second block size, where N is an integer larger than 1. In yet another example, the first block size is at least two-pixel high. In still yet another example, the second block size is one pixel high.

Figure 6:
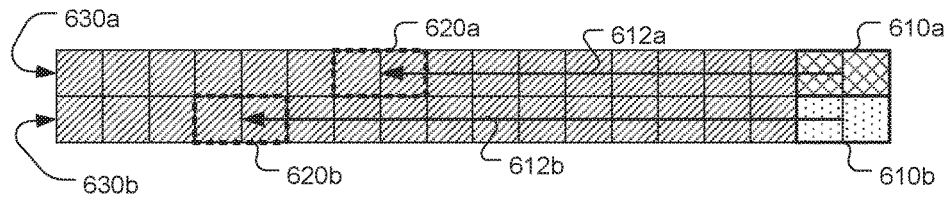
FIG. 6 illustrates an example using the method of deriving two predictors for two different partitions from two different pixel line groups.

FIG. 6 illustrates an example of predictors for partitions belonging to different pixel line groups are derived from the different pixel line groups respectively. A 2×2 block is divided into two partitions 610*a* and 610*b* and each is coded using the 1×2 block prediction mode. According to this method, partition 610*a* is in the upper pixel line 630*a* and is allowed to use reconstructed pixels in the upper pixel line 630*a* to derive candidate predictor. Therefore, a predictor 620*a* is in the upper pixel line 630*a* with corresponding block vector 612*a* is used for partition 610*a*. Similarly, a predictor 620*b* is in the lower pixel line 630*b* with corresponding block vector 612*b* is used for partition 610*b*. In this example, each pixel line group comprises only one pixel line.

According to another method of the present invention, the chrominance pixels are coded using block vector associated with the corresponding luminance pixels. For example, when a block is divided into two partitions, the predictors of luminance pixel of the two partitions are derived from the same luminance pixel line group, where the pixel line group comprises one or more pixel lines. For example, if each partition corresponds to a 1×2 block, the corresponding pixel line group contains only one pixel line. The block vector of one selected luminance partition can be used as the block vector of chrominance pixels of the current block. The predictor of chrominance pixels of the current block can be derived from the chrominance pixel belonging to the luminance predictor of the selected luminance partition.

Figure 7A:
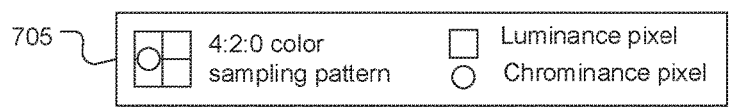
FIG. 7A illustrates an example of 4:2:0 color sampling pattern, where one chrominance pixel exists for every four luminance pixels, where the location of the chrominance pixel is in the middle of the two left luminance pixels.
Figure 7B:
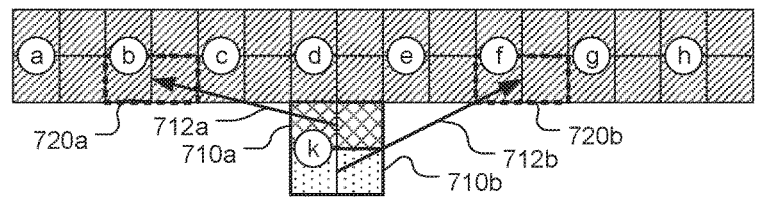
FIG. 7B illustrates an example of derivation of chrominance predictor derivation for the color sampling pattern in FIG. 7A based on predictors for the luminance pixels of the current block.
Figure 7C:
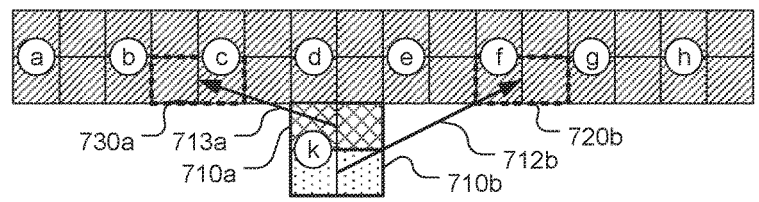
FIG. 7C illustrates another example of derivation of chrominance predictor derivation for the color sampling pattern in FIG. 7A based on predictors for the luminance pixels of the current block.

FIG. 7A illustrates an example of 4:2:0 color sampling pattern 705, where one chrominance pixel exists for every four luminance pixels. The location of the chrominance pixel in this example is in the middle of the two left luminance pixels. FIG. 7B illustrates an example of chrominance predictor derivation according to this method. In this example, the 2×2 block is partitioned into two partitions 710*a* and 710*b* and each partition is encoded using block prediction with block size equal to 1×2. Two predictors 720*a* and 720*b* in a same pixel line are located using block vectors 712*a* and 712*b* respectively. If the predictor for the upper partition (i.e., 710*a*) is used to determine the predictor of the chrominance pixels of the current block, chrominance pixel "b" will be used as the predictor of the chrominance pixel "k" of the current block. FIG. 7C illustrates another example of chrominance predictor derivation according to this method. In this example, predictor 730*a* is located using block vector 713*a*. If the predictor for the upper partition (i.e., 710*a*) is used to determine the predictor of the chrominance pixels of the current block, chrominance pixel "c" will be used as the predictor of the chrominance pixel "k" of the current block.

Figure 8A:
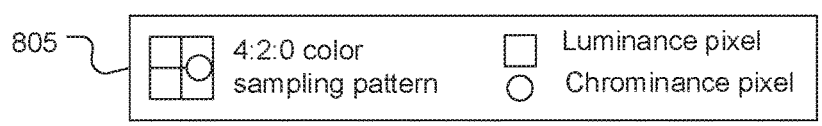
FIG. 8A illustrates an example of 4:2:0 color sampling pattern, where one chrominance pixel exists for every four luminance pixels, where the location of the chrominance pixel is in the middle of the two right luminance pixels.
Figure 8B:
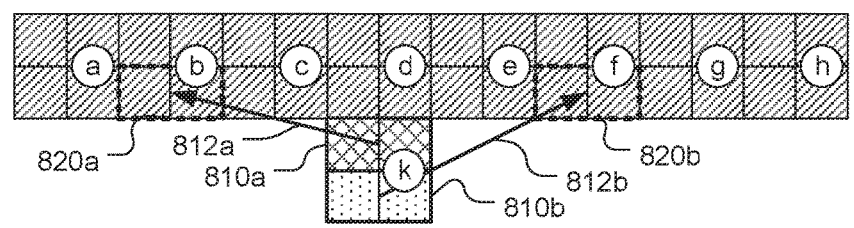
FIG. 8B illustrates an example of derivation of chrominance predictor derivation for the color sampling pattern in FIG. 8A based on predictors for the luminance pixels of the current block.
Figure 8C:
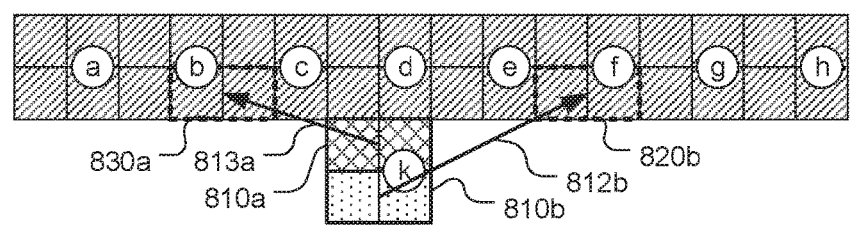
FIG. 8C illustrates another example of derivation of chrominance predictor derivation for the color sampling pattern in FIG. 8A based on predictors for the luminance pixels of the current block.

FIG. 8A illustrates an example of 4:2:0 color sampling pattern 805, where one chrominance pixel exists for every four luminance pixels. The location of the chrominance pixel in this example is in the middle of the two right luminance pixels. FIG. 8B illustrates an example of chrominance predictor derivation according to this method. In this example, the 2×2 block is partitioned into two partitions 810*a* and 810*b* and each partition is encoded using block prediction with block size equal to 1×2. Two predictors 820*a* and 820*b* in a same pixel line are located using block vectors 812*a* and 812*b* respectively. If the predictor for the upper partition (i.e., 810*a*) is used to determine the predictor of the chrominance pixels of the current block, chrominance pixel "b" will be used as the predictor of the chrominance pixel "k" of the current block. FIG. 8C illustrates another example of chrominance predictor derivation according to this method. In this example, predictor 830*a* is located using block vector 813*a*. If the predictor for the upper partition (i.e., 810*a*) is used to determine the predictor of the chrominance pixels of the current block, chrominance pixel "b" will be used as the predictor of the chrominance pixel "k" of the current block.

Figure 9A:
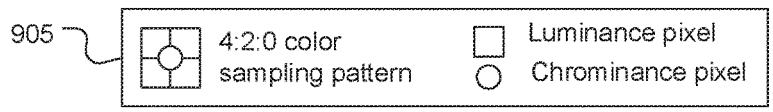
FIG. 9A illustrates an example of 4:2:0 color sampling pattern, where one chrominance pixel exists for every four luminance pixels, where the location of the chrominance pixel is in the center of the four luminance pixels.
Figure 9B:
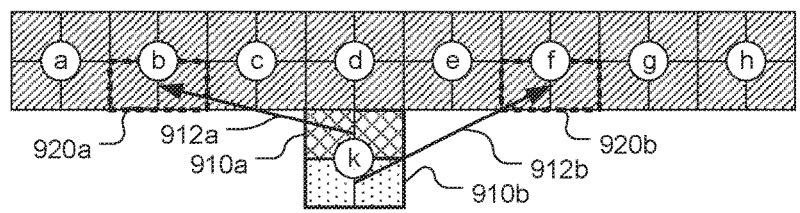
FIG. 9B illustrates an example of derivation of chrominance predictor derivation for the color sampling pattern in FIG. 9A based on predictors for the luminance pixels of the current block.
Figure 9C:
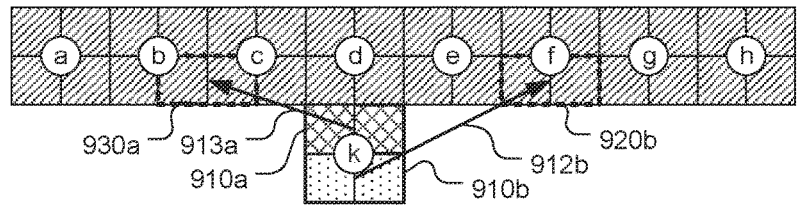
FIG. 9C illustrates another example of derivation of chrominance predictor derivation for the color sampling pattern in FIG. 9A based on predictors for the luminance pixels of the current block.

FIG. 9A illustrates an example of 4:2:0 color sampling pattern 905, where one chrominance pixel exists for every four luminance pixels. The location of the chrominance pixel in this example is in the middle of the four luminance pixels. FIG. 9B illustrates an example of chrominance predictor derivation according to this method. In this example, the 2×2 block is partitioned into two partitions 910*a* and 910*b* and each partition is encoded using block prediction with block size equal to 1×2. Two predictors 920*a* and 920*b* in a same pixel line are located using block vectors 912*a* and 912*b* respectively. If the predictor for the upper partition (i.e., 910*a*) is used to determine the predictor of the chrominance pixels of the current block, chrominance pixel "b" will be used as the predictor of the chrominance pixel "k" of the current block. FIG. 9C illustrates another example of chrominance predictor derivation according to this method. In this example, predictor 930*a* is located using block vector 913*a*. If the predictor for the upper partition (i.e., 910*a*) is used to determine the predictor of the chrominance pixels of the current block, chrominance pixel "b" or "c" will be used as the predictor of the chrominance pixel "k" of the current block. In this case of multiple candidate predictors, the selection information may be signaled in the bitstream so that the decoder can use the same predictor as the encoder. Alternatively, a predictor may be derived from multiple candidate predictors by applying arithmetic operations on the multiple candidate predictors. For example, the average of chrominance pixel "b" and chrominance pixel "c" can be used as the chrominance predictor for chrominance pixel "k" in FIG. 9C.

In the above examples for chrominance predictor derivation, the predictors for partitions of the current block in different pixel line groups are always derived from the same reconstructed pixel line group. Nevertheless, the present method is not restricted to use the same pixel line group for deriving the predictors. According to another embodiment, the predictors for partitions of the current block in different pixel line groups can be derived from different pixel line groups respectively.

Figure 10:
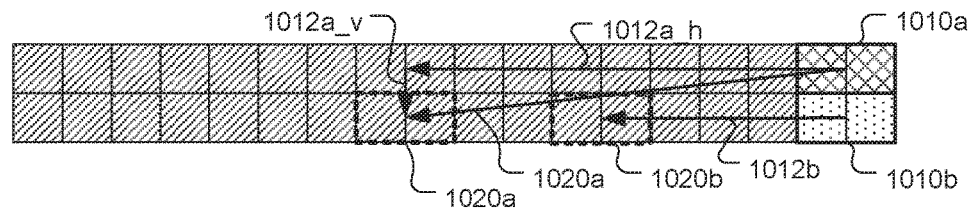
FIG. 10 illustrates an example of predictors for partitions of the current block, where the block vectors pointing from the partitions to the predictors may be two-dimensional.

According to another method of present invention, when block prediction using variable block sizes is enabled for the current block, the current block may use block prediction with a first block size and a second block size, where the first block size is larger than the second block size. When block prediction with the first block size is used for the current block, the block vectors are restricted to be one-dimensional. When block prediction with the second block size is used for the current block, the block vectors are allowed to be one-dimensional. For example, the system may partition the picture into one or more slices and each slice is further divided into multiple blocks. The blocks are coded using block prediction modes with variable block sizes. For example, the first block size corresponds to 2×2 and the second block size corresponds to 1×2. The 2×2 block prediction according to this method can be the same as other methods disclosed above, such as that shown in FIG. 6A. An example of 1×2 block prediction according to this method is shown in FIG. 10. In this example, the lower partition 1010*b* is coded using block prediction with a one-dimensional block vector 1012*b* to point to the predictor 1020*b*. The upper partition 1010*a* in this example has a two-dimensional block vector 1020*a* to point to predictor 1020*a*. The two-dimensional block vector 1020*a* has a horizontal component 1012*a*_*h* and a vertical component 1012*a*_*v*.

Figure 1A:
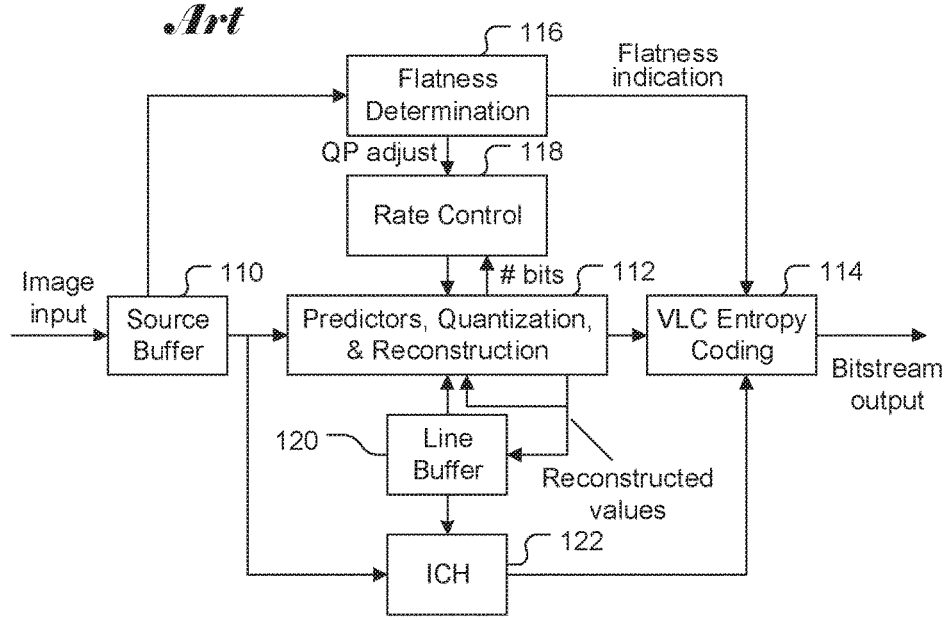
FIG. 1A illustrates major functional blocks of an exemplary system based on the Display Stream Compression (DSC) standard.
Figure 1B:
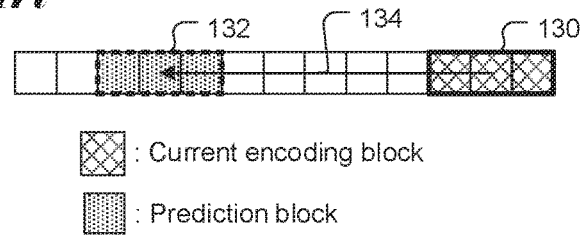
FIG. 1B illustrates an example of block prediction according to the Display Stream Compression (DSC) standard.
Figure 1C:
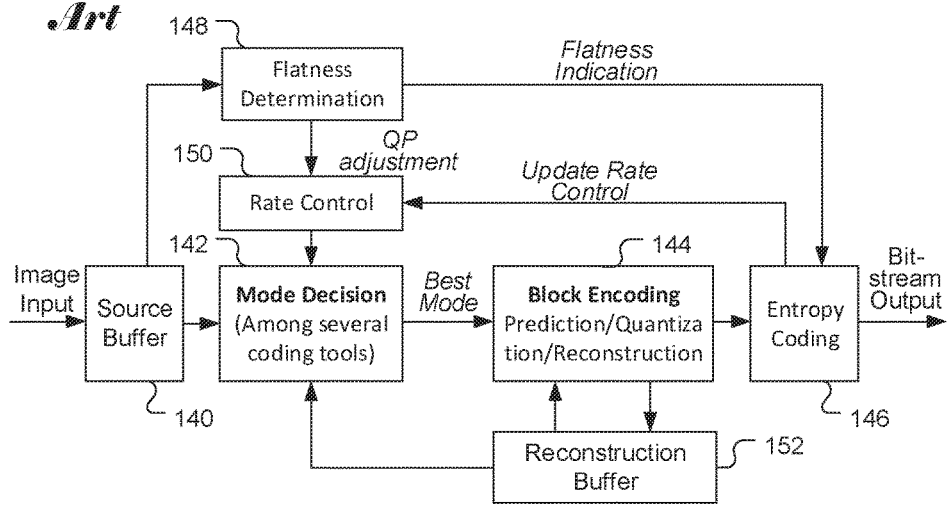
FIG. 1C illustrates major functional blocks of an exemplary system based on the Advanced Display Stream Compression (ADSC) draft.
Figure 11A:
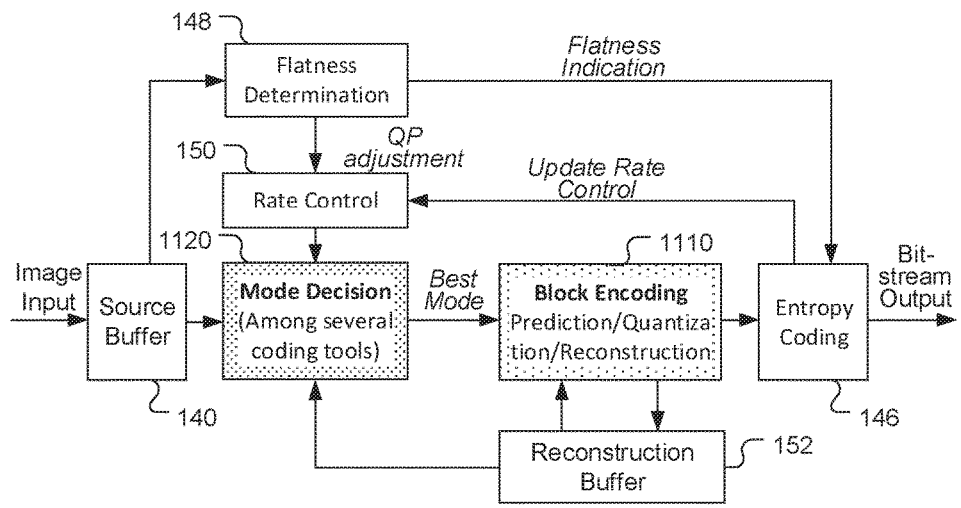
FIG. 11A illustrates major functional blocks of an exemplary system incorporating variable-size block prediction according to an embodiment of the present invention.

FIG. 11A illustrates major functional blocks of an exemplary system incorporating variable-size block prediction according to an embodiment of the present invention. The coding system is based on the coding system shown in FIG. 1C. However, block encoding unit 1110 is based on the new block prediction as disclosed above. Also, the mode decision unit 1120 takes into account of the new block prediction mode during the best mode determination. The remaining major functional b locks may stay the same.

Figure 1D:
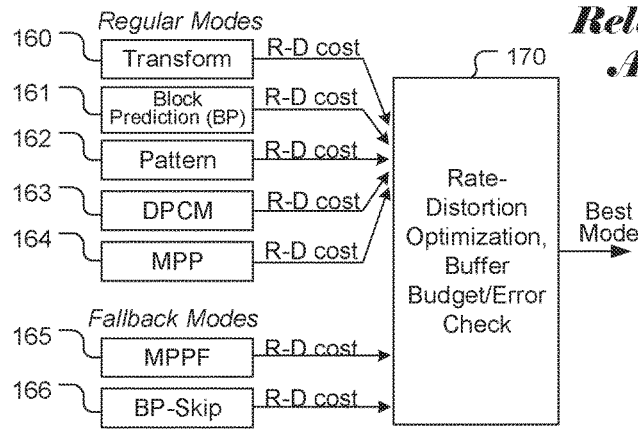
FIG. 1D illustrates mode decision process according to the Advanced Display Stream Compression (ADSC) draft.
Figure 11B:
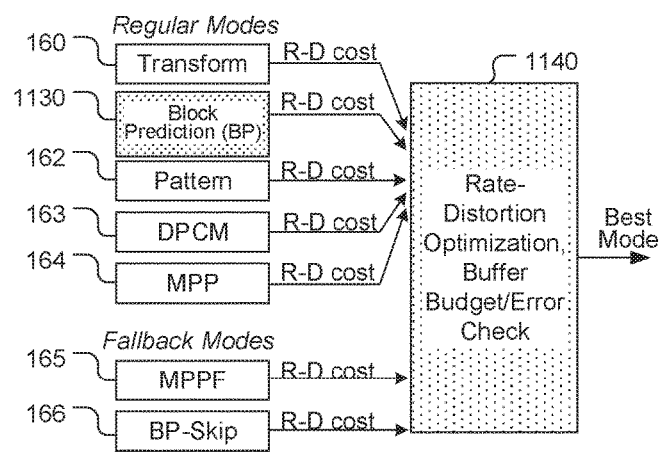
FIG. 11B illustrates mode decision process according to an exemplary system incorporating variable-size block prediction according to an embodiment of the present invention.

FIG. 11B illustrates mode decision process according to an exemplary system incorporating variable-size block prediction according to an embodiment of the present invention. The mode decision process is based on the mode decision process in FIG. 1D. However, a new block prediction unit 1130 is used. Also, a new processing unit (1140) is used to perform the rate-distortion optimization, buffer budget and error check function.

Figure 12:
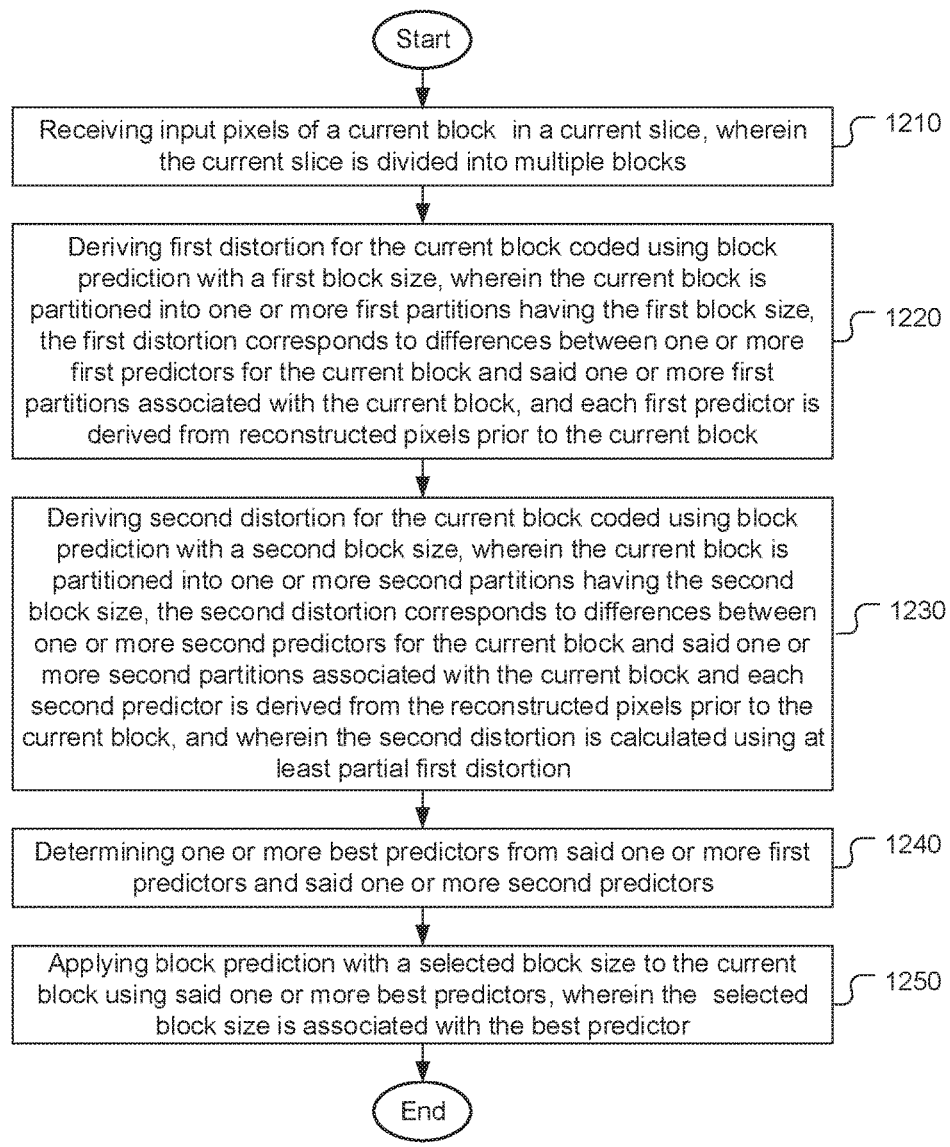
FIG. 12 illustrates a flowchart for an exemplary encoding system incorporating an embodiment of the present invention, where the distortion associated with block prediction with a first block size reuses the distortion associated with block prediction with a second block size.

FIG. 12 illustrates a flowchart for an exemplary encoding system incorporating an embodiment of the present invention, where the distortion associated with block prediction with a first block size reuses the distortion associated with block prediction with a second block size. The system receives input pixels of a current block in a current slice in step 1210, where the current slice is divided into multiple blocks. First distortion for the current block coded using block prediction with a first block size is derived in step 1220, where the current block is partitioned into one or more first partitions having the first block size. The first distortion corresponds to differences between one or more first predictors for the current block and said one or more first partitions associated with the current block, and each first predictor is derived from reconstructed pixels prior to the current block. If the first block size is equal to the current block size, the current block will not be partitioned and there will be only one predictor for the current block. However, the first block size is smaller than the current block size (e.g. ½), the current block will be divided into multiple partitions and multiple predictors will be derived. Second distortion for the current block coded using block prediction with a second block size is derived in step 1230, where the current block is partitioned into one or more second partitions having the second block size. The second distortion corresponds to differences between one or more second predictors for the current block and said one or more second partitions associated with the current block and each second predictor is derived from the reconstructed pixels prior to the current block, and where the second distortion is calculated using at least partial first distortion. One or more best predictors are determined from said one or more first predictors and said one or more second predictors in step 1240. Block prediction with a selected block size is applied to the current block using said one or more best predictors in step 1250, where the selected block size is associated with the best predictor.

Figure 13:
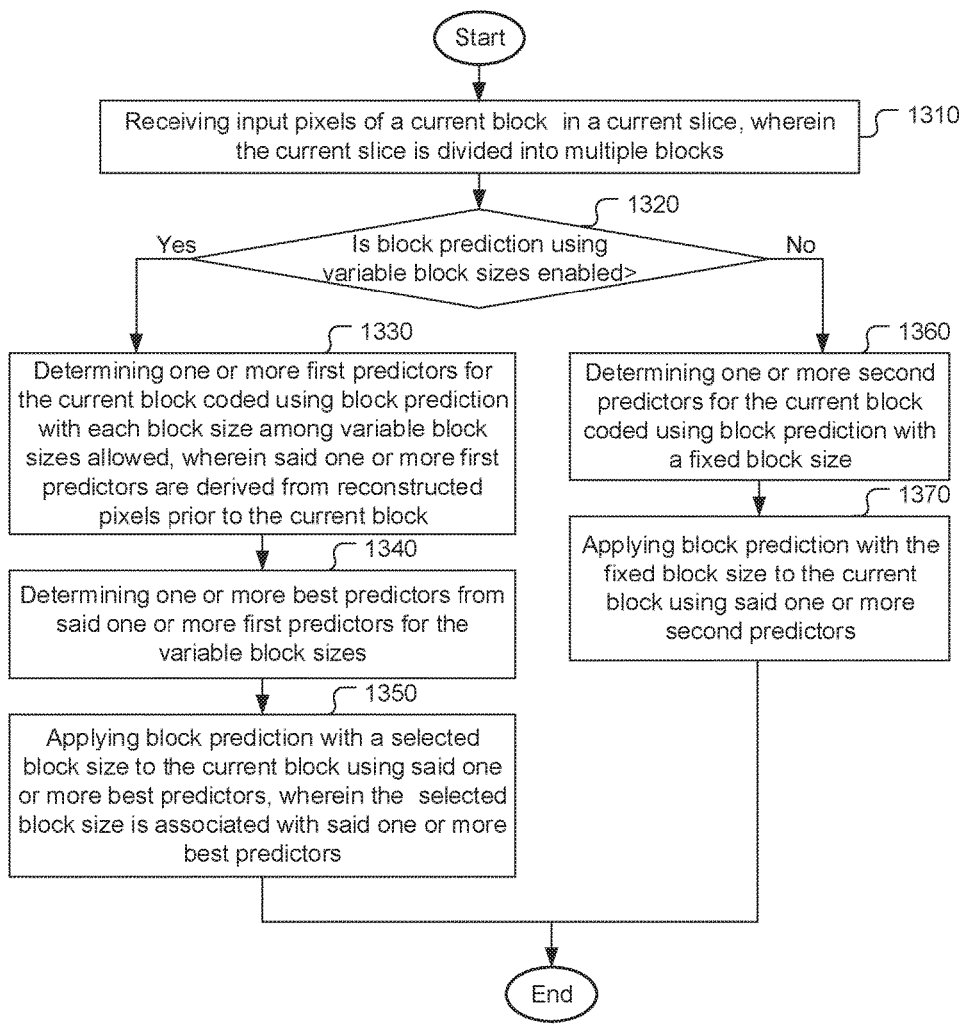
FIG. 13 illustrates a flowchart for an exemplary coding system incorporating an embodiment of the present invention, where information is signaled to indicate whether block prediction using variable block sizes is enabled.

FIG. 13 illustrates a flowchart for an exemplary coding system incorporating an embodiment of the present invention, where information is signaled to indicate whether block prediction using variable block sizes is enabled. The system receives input data associated with a current block in a current slice in step 1310, where the current slice is divided into multiple blocks. In the encoder side, the input data associated with the current block corresponds to pixel values of the current block to be coded. At the decoder size, the input data associated with the current block corresponds to coded data or bitstream comprising the current block. Whether the block prediction using variable block sizes is enabled is checked in step 1320. If the result is "Yes", steps 1330 through 1350 are executed. If the result is "No", steps 1370 through 1370 are executed. In step 1330, one or more first predictors are determined for the current block coded using block prediction with each block size among variable block sizes allowed, wherein said one or more first predictors are derived from reconstructed pixels prior to the current block. In step 1340, one or more best predictors are determined from said one or more first predictors for the variable block sizes. In step 1350, block prediction with a selected block size is applied to the current block using said one or more best predictors, wherein the selected block size is associated with said one or more best predictors. In step 1360, one or more second predictors are determined for the current block coded using block prediction with a fixed block size. In step 1370, block prediction with the fixed block size is applied to the current block using said one or more second predictors.

Figure 14:
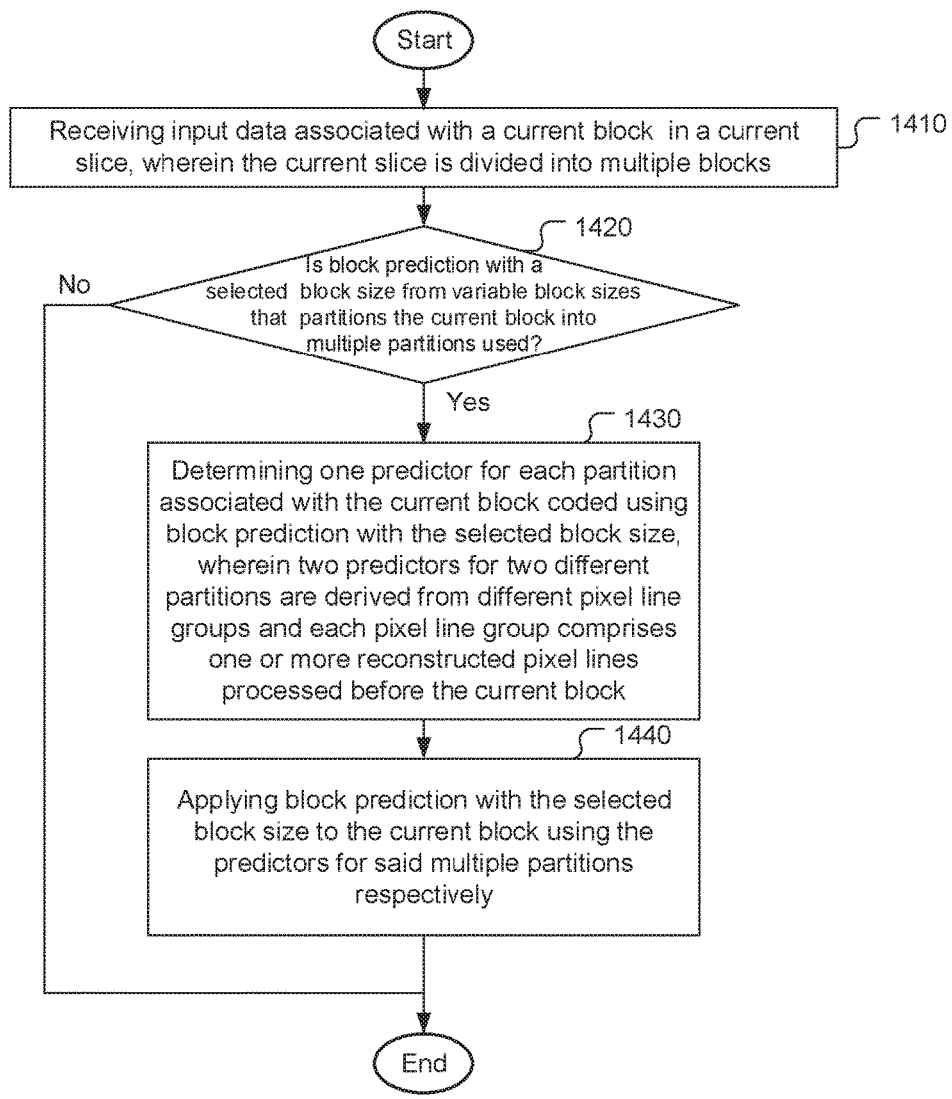
FIG. 14 illustrates a flowchart for an exemplary coding system incorporating an embodiment of the present invention, where two predictors for two different partitions are derived from different pixel line groups and each pixel line group comprises one or more reconstructed pixel lines processed before the current block.

FIG. 14 illustrates a flowchart for an exemplary coding system incorporating an embodiment of the present invention, where two predictors for two different partitions are derived from different pixel line groups and each pixel line group comprises one or more reconstructed pixel lines processed before the current block. The system receives input data associated with a current block in a current slice, wherein the current slice is divided into multiple blocks in step 1410. Whether block prediction with a selected block size from variable block sizes that partitions the current block into multiple partitions is used is checked in step 1420. If the result is "Yes", steps 1430 through 1440 are executed. If the result is "No", steps 1430 through 1440 are skipped. In step 1430, one predictor for each partition associated with the current block coded using block prediction with the selected block size is determined, where two predictors for two different partitions are derived from different pixel line groups and each pixel line group comprises one or more reconstructed pixel lines processed before the current block. In step 1440, block prediction with the selected block size is applied to the current block using the predictors for said multiple partitions respectively.

Figure 15:
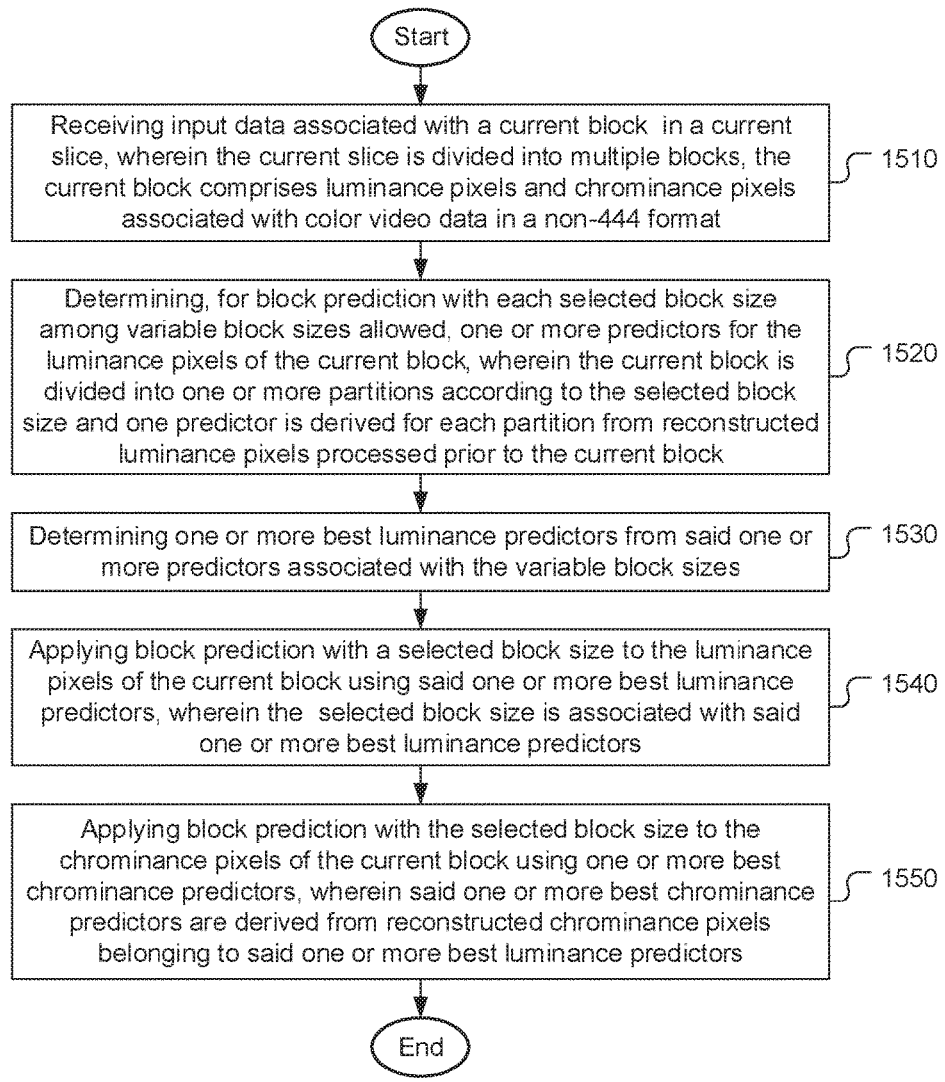
FIG. 15 illustrates a flowchart for an exemplary coding system incorporating an embodiment of the present invention, where the image data are in a non-444 format, and predictors for chrominance pixels of the current block are derived from chrominance pixels belonging to predictors for the luminance pixels of the current block.

FIG. 15 illustrates a flowchart for an exemplary coding system incorporating an embodiment of the present invention, where the image data are in a non-444 format, and predictors for chrominance pixels of the current block are derived from chrominance pixels belonging to predictors for the luminance pixels of the current block. As known in the field of color image and video data, the color signal may be represented by luminance and chrominance components (e.g., YUV). In order to conserve bandwidth, reduce bit-rate or reduce required processing, the chrominance signal is often in a sub-sampled format, such as YUV422 and YUV420 formats. The 444 format (e.g. YUV444) corresponds to a format with all components full-resolution. The non-444 format refers to any color format with a sub-sampled chrominance component. The system receives input data associated with a current block in a current slice in step 1510, where the current slice is divided into multiple blocks, and the current block comprises luminance pixels and chrominance pixels associated with color image data in a non-444 format. One or more predictors for the luminance pixels of the current block are determined for block prediction with each selected block size among variable block sizes allowed in step 1520. The current block is divided into one or more partitions according to the selected block size and one predictor is derived for each partition from reconstructed luminance pixels processed prior to the current block. One or more best luminance predictors are determined from said one or more predictors associated with the variable block sizes in step 1530. Block prediction with a selected block size is applied to the luminance pixels of the current block using said one or more best luminance predictors in step 1540, where the selected block size is associated with said one or more best luminance predictors. Block prediction with the selected block size is applied to the chrominance pixels of the current block using one or more best chrominance predictors in step 1550, where said one or more best chrominance predictors are derived from reconstructed chrominance pixels belonging to said one or more best luminance predictors.

Figure 16:
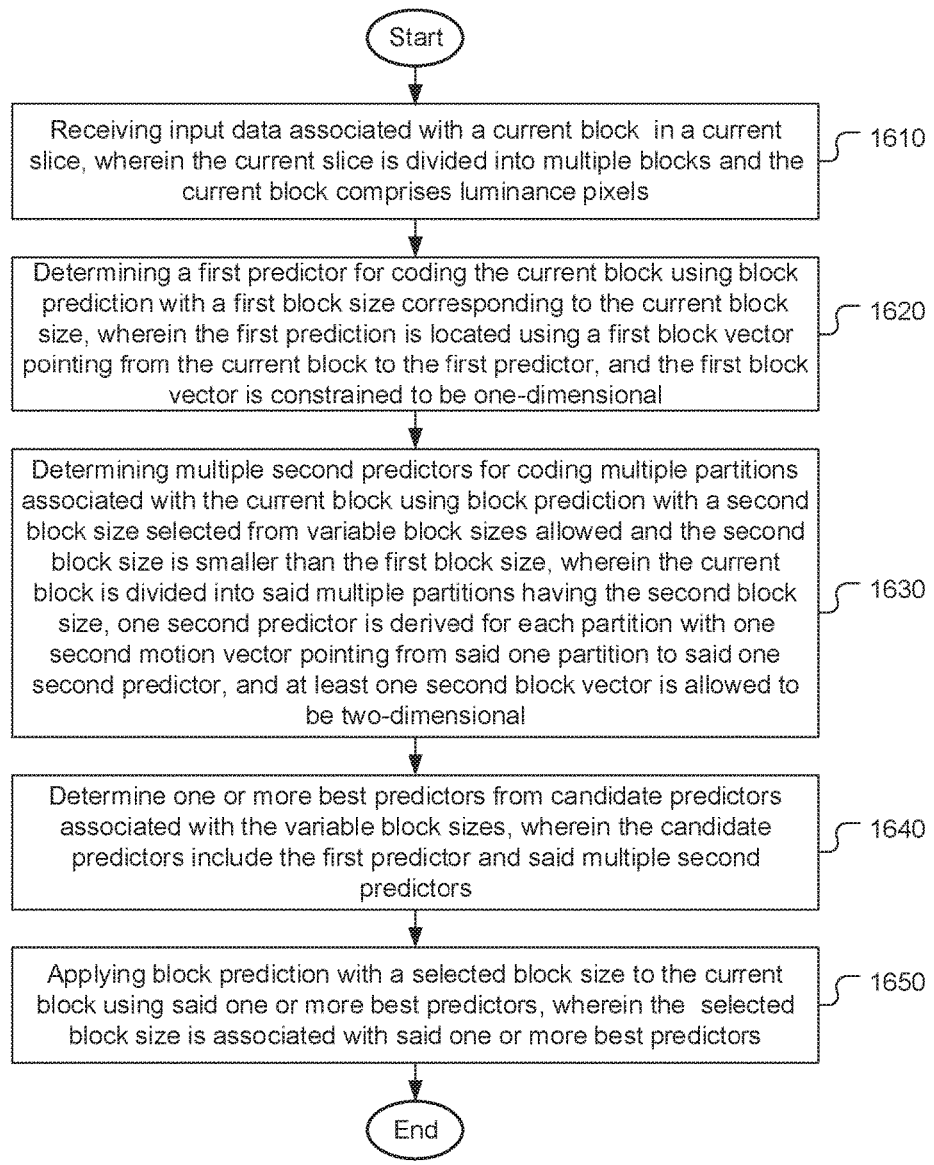
FIG. 16 illustrates a flowchart for an exemplary coding system incorporating an embodiment of the present invention, where the current block is divided into multiple partitions, and one predictor is derived for each partition with one block vector allowed to be two-dimensional.

FIG. 16 illustrates a flowchart for an exemplary coding system incorporating an embodiment of the present invention, where the current block is divided into multiple partitions, and one predictor is derived for each partition with one block vector allowed to be two-dimensional. The system receives input data associated with a current block in a current slice in step 1610, where the current slice is divided into multiple blocks and the current block comprises luminance pixels. A first predictor for coding the current block using block prediction with a first block size corresponding to the current block size is determined in step 1620, where the first prediction is located using a first block vector pointing from the current block to the first predictor, and the first block vector is constrained to be one-dimensional. Multiple second predictors are determined for coding multiple partitions associated with the current block using block prediction with a second block size selected from variable block sizes allowed and the second block size is smaller than the first block size in step 1630, where the current block is divided into said multiple partitions having the second block size, one second predictor is derived for each partition with one second block vector pointing from said one partition to said one second predictor, and at least one second block vector is allowed to be two-dimensional. One or more best predictors from candidate predictors associated with the variable block sizes are determined in step 1640, where the candidate predictors include the first predictor and said multiple second predictors. Block prediction with a selected block size is applied to the current block using said one or more best predictors in step 1650, where the selected block size is associated with said one or more best predictors.

The flowcharts shown above are intended to illustrate examples of image coding incorporating an embodiment of the present invention. A person skilled in the art may modify each step, re-arrange the steps, split a step, or combine the steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a image compression chip or program code integrated into image compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding using block prediction using variable block sizes, the method comprising:
   receiving input data associated with a current block in a current slice, wherein the current slice is divided into multiple blocks;
   determining block prediction with a selected block size from variable block sizes that partitions the current block into multiple partitions is used;
   determining one predictor for each partition associated with the current block coded using block prediction with the selected block size, comprising:
      deriving a first predictor for a first partition from a first pixel line group, wherein the first predictor and the first partition are in a first pixel line in the first pixel line group; and
      deriving a second predictor for a second partition from a second pixel line group different than the first pixel line group, wherein the second predictor and the second partition are in a second pixel line in the second pixel line group;
      wherein each of the first and second pixel line groups comprises one or more reconstructed pixel lines processed before the current block, and wherein the first line, the second line, or both, are outside of an upper-most line of the current slice; and
   applying block prediction with the selected block size to the current block using the first and second predictors for said multiple partitions respectively.

2. The method of claim 1, wherein said variable block sizes comprise 2×2 and 1×2 and the selected block size corresponds to 1×2.

3. The method of claim 2, wherein when block prediction with the selected block size is used, the method further comprises dividing a current 2×2 block into an upper 1×2 partition and a lower 1×2 partition.

4. The method of claim 3, further comprising:
deriving the first predictor for the upper 1×2 partition from the first pixel line, wherein the first pixel line includes the upper 1×2 partition; and
deriving the second predictor for the lower 1×2 partition from the second pixel line, wherein the second pixel line includes the lower 1×2 partition.

5. An apparatus for video coding using block prediction using variable block sizes, the apparatus comprising a processor configured to execute machine-readable instructions that, when executed by the processor, cause the processor to:
receive input data associated with a current block in a current slice, wherein the current slice is divided into multiple blocks;
determine block prediction with a selected block size from variable block sizes that partitions the current block into multiple partitions is used;
determine one predictor for each partition associated with the current block coded using block prediction with the selected block size, comprising:
deriving a first predictor for a first partition from a first pixel line group, wherein the first predictor and the first partition are in a first pixel line in the first pixel line group; and
deriving a second predictor for a second partition from a second pixel line group different than the first pixel line group, wherein the second predictor and the second partition are in a second pixel line in the second pixel line group;
wherein each of the first and second pixel line groups comprises one or more reconstructed pixel lines processed before the current block, and wherein the first line, the second line, or both, are outside of an upper-most line of the current slice; and
apply block prediction with the selected block size to the current block using the first and second predictors for said multiple partitions respectively.

6. The apparatus of claim 5, wherein said variable block sizes comprise 2×2 and 1×2 and the selected block size corresponds to 1×2.

7. The apparatus of claim 6, wherein when block prediction with the selected block size is used, the method further comprises dividing a current 2×2 block into an upper 1×2 partition and a lower 1×2 partition.

8. The apparatus of claim 7, wherein the machine-readable instructions are further configured to cause the processor to:
derive the first predictor for the upper 1×2 partition from the first pixel line, wherein the first pixel line includes the upper 1×2 partition; and
derive the second predictor for the lower 1×2 partition from the second pixel line, wherein the second pixel line includes the lower 1×2 partition.

* * * * *